May 16, 1961     H. DRAKE     2,984,207
SHRIMP HATCHER

Filed March 19, 1959     2 Sheets-Sheet 1

INVENTOR
HOMER DRAKE

BY Cushman, Darby & Cushman
ATTORNEYS

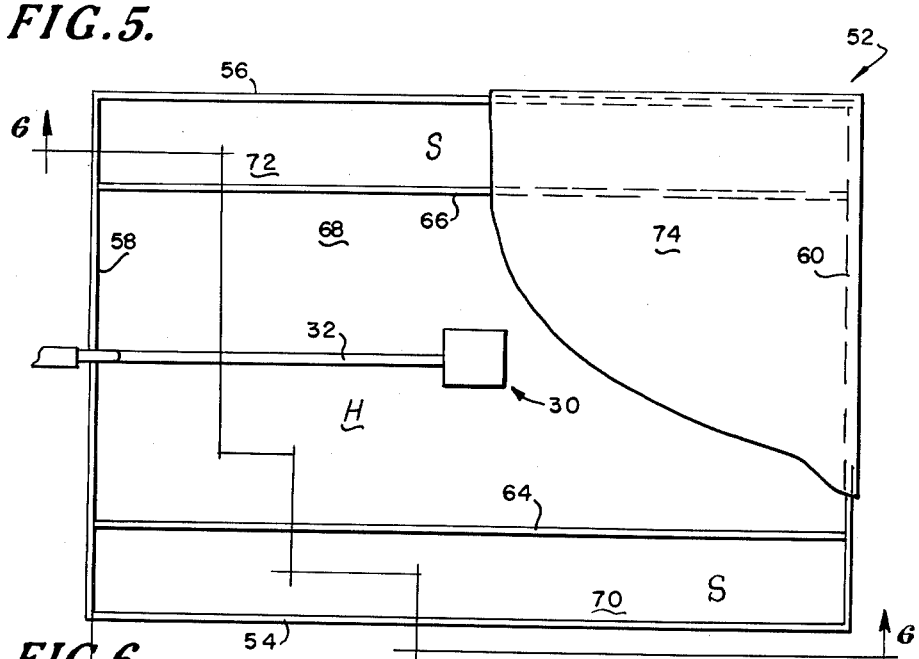
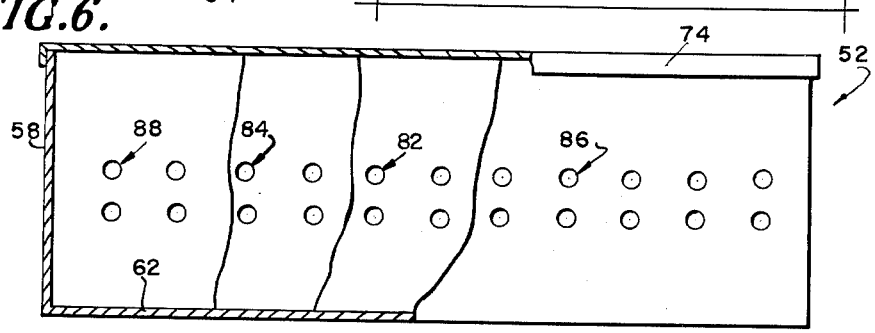
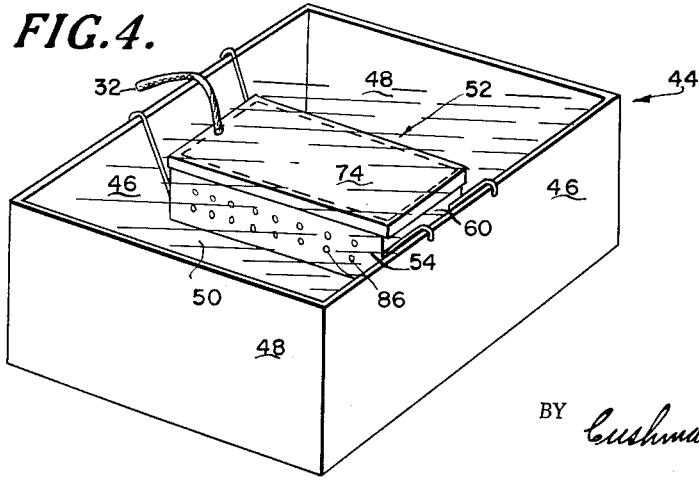

United States Patent Office 2,984,207
Patented May 16, 1961

2,984,207

SHRIMP HATCHER

Homer Drake, 3321 Oakland Park Blvd., Fort Lauderdale, Fla.

Filed Mar. 19, 1959, Ser. No. 800,487

14 Claims. (Cl. 119—2)

This invention generally relates to a hatchery for producing live shrimp and has particular reference to an improved brine hatcher which, by controlling the migratory movement of the swimming shrimp, effects a complete separation from the unhatched eggs and shell debris.

Heretofore, various attempts have been made to effectively separate hatched shrimp from the remaining debris. However, due to the swimming movement of the living shrimp before they migrate toward a collection chamber, the waste debris will be continuously agitated to preclude complete separation since a substantial portion of the agitated debris tends to escape with the shrimp as they migrate through the outlet passageways leading from the hatching compartment to contaminate the shrimp collection chamber. Additionally, this defect prevented any aeration of the hatching compartment while migrational movement of the shrimp was in progress, otherwise the agitated debris would be expelled directly through the shrimp passageways into the collecting chamber.

Accordingly, it is the primary object of the present invention to provide an improved shrimp hatcher which effects complete separation of the living shrimp from the remaining debris without interrupting migration of the shrimp from the hatching compartment to the collection chamber.

A further object of this invention resides in the provision of a shrimp hatcher which permits continuous aeration of the egg hatching compartment to accelerate shrimp production without interrupting migratory movement of the living shrimp toward the collection chamber.

A still further object of the present invention relates to a shrimp hatcher which employs a separate subsidance chamber for effectively separating the debris which is suspended in the brine solution from the living shrimp as they migrate from the egg hatching compartment toward the collection chamber.

An additional object of this invention relates to means for interrupting the flow of fluid between the egg hatching chamber and the collection chamber while living shrimp are being removed from the shrimp hatcher.

A still further object of the present invention is to provide a shrimp hatcher of the above character which is extremely simple in construction, thoroughly reliable and effective in operation, neat and attractive in appearance, completely sanitary, relatively inexpensive to manufacture, and otherwise well adapted for the purposes for which the same is intended.

Other objects and the entire scope of the present invention will become apparent from the detailed description given hereinafter. It should be understood, however, that the detailed description and specific example, while indicating the preferred embodiments of the invention, are given by way of illustration only, since various changes and modifications within the spirit and scope of the invention will become apparent as the description herein progresses.

Reference being made to the accompanying drawing which forms a part hereof, wherein like numerals refer to like parts throughout, and in which;

Figure 4 is a perspective view of a removable hatcher assembly positioned within a separate fluid receptacle;

Figure 5 is a top plan view, partially in section of the modified shrimp hatcher illustrated in Figure 4; and Figure 6 is a longitudinal cross-sectional view, with parts broken away, taken along the line 6—6 of Figure 5.

Figure 1:
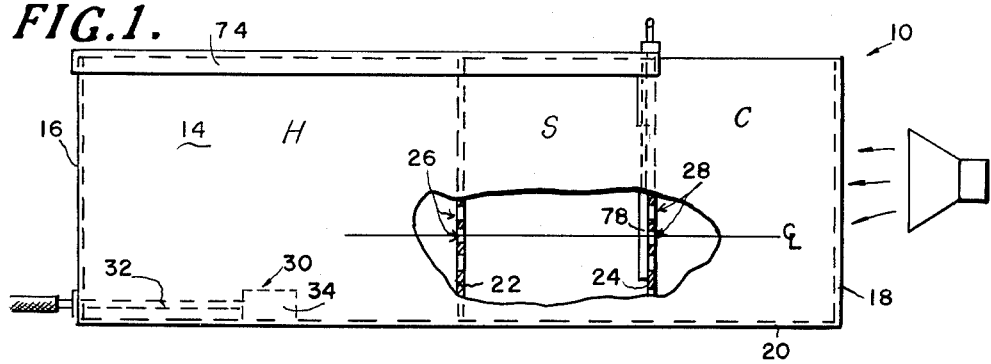
Figure 1 is a longitudinal side elevational view, partially in section, of a shrimp hatcher constructed in accordance with the principles of the present invention.

Referring now to the drawings in detail, wherein for the purposes of illustration, several preferred embodiments of the present invention are shown, the numeral 10 generally represents a fluid receptacle having the usual vertical sidewalls 12 and 14 which are joined together by end walls 16 and 18 and a bottom member 20. Located within fluid receptacle 10 are a pair of longitudinally spaced interior partitions 22 and 24 which extend transversely between sidewalls 12 and 14 and bottom member 20 for dividing the fluid receptacle into three separate compartments. The first compartment, which is defined by sidewalls 12 and 14, end wall 16, bottom member 20 and dividing partition 22 forms an egg hatching chamber, generally designated by the letter H, while a collection chamber, designated by the letter C, is formed between end wall 18 and the interior partition 24 at the opposite end of fluid receptacle 10. Disposed between hatching chamber H and collection chamber C is an intermediate subsidance chamber S which is defined by interior divider partitions 22 and 24, as shown in Figure 1.

In order to permit continuous fluid communication between the aforementioned chambers, suitable apertures 26 and 28 have been formed in each of the interior partitions 22 and 24, respectively, in a manner which will become readily apparent.

Additionally, hatching chamber H can be agitated by any suitable type of aquarium aerating device 30 which tends to continuously disburse streams of extremely small air bubbles for causing a slight turbulence within the chamber. This slight turbulence serves to impart a continuous agitating effect on the unhatched shrimp eggs which are suspended within the brine solution contained in the fluid receptacle 10. As shown, aerating device 30 includes a conduit 32 formed of non-corrosive material; such as, plastic, glass, rubber, or the like, which delivers a continuous supply of air under pressure from any suitable source (not shown). The terminal end of conduit 32 preferably is coupled to a suitable air distributor 34, such as a pervious air stone or perforated tube, which disburses the air outwardly along the bottom of the hatching chamber H, as previously described. However, it should be understood that continuous aeration of the hatching chamber merely serves to accelerate shrimp production, and therefore, the aerating operation may be omitted altogether without affecting eventual hatching of the shrimp eggs. In other words, while aeration is not essential to the hatching operation, it is often desirable to accelerate production.

Figure 2:
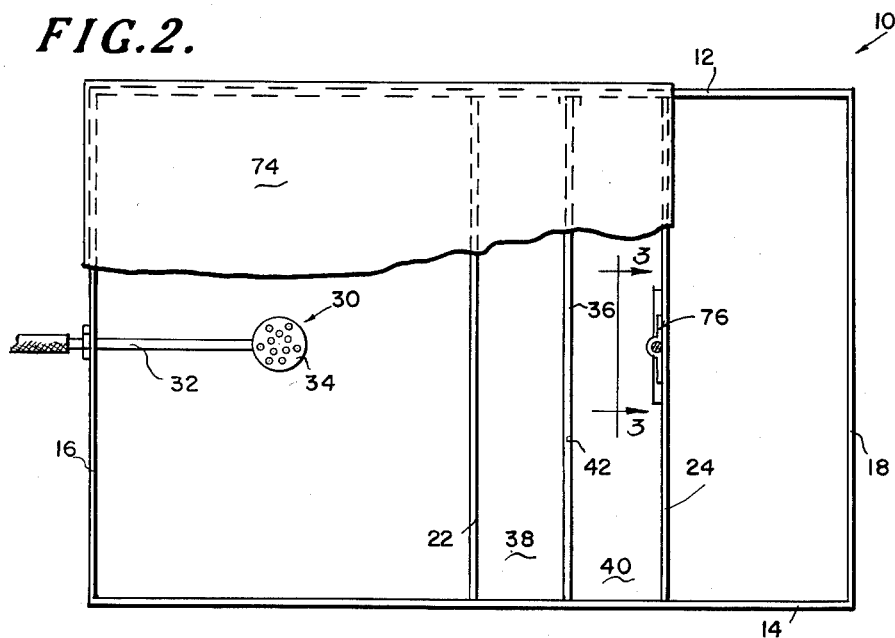
Figure 2 is a top plan view, partially in section, of the shrimp hatcher shown in Figure 1 which has been slightly modified to include primary and secondary subsidance chambers.
Figure 3:
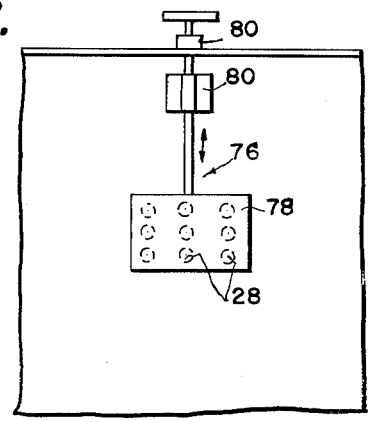
Figure 3 is a fragmentary cross-sectional view taken along the line 3—3 of Figure 2.

A slightly modified embodiment of this invention has been illustrated in Figure 2 wherein an additional secondary dividing wall 36 has been introduced between interior dividers 22 and 24 to form primary and secondary subsidance compartments 38 and 40, respectively, therebetween. Additionally, suitable apertures 42 have been formed along the secondary dividing wall 36 in a manner which will be presently discussed. In this connection, a suitable aquarian aerating device can be employed with this embodiment in a manner previously described, particularly where accelerated production is desired. The previously described shrimp hatchers preferably are constructed in the form of an integral unit which serves to first hatch and then collect the living shrimp. However, an alternative embodiment has been illustrated in Figure 4 which can be inserted, as a unit, within a separate fluid receptacle. As shown, the outer fluid receptacle, generally illustrated in the form of a separate aquarium 44, is employed having the customary side and end walls 46 and 48, respectively, and bottom 50. Suspended within aquarium 44 is a unitary hatching assembly, generally represented by the numeral 52, which is detachably connected to the fluid receptacle 44 in any well known manner. The rectangular hatching assembly 52, preferably includes a pair of outer side panels 54 and 56 which are joined together at their ends by end panels 58 and 60 and along the bottom by member 62. Located within the hatching assembly are a pair of interior partitions 64 and 66 which extend longitudinally between end panels 58 and 60 for dividing the unit into three separate compartments. The middle compartment 68 serves as an egg hatching chamber H, while the adjacent outer compartments 70 and 72 each form individual subsidance chambers for collecting extraneous debris. Suitable rows of apertures 82 and 84 have been formed in each of the longitudinal partitions 64 and 66, while related openings 86 and 88 are formed in the outer side panels 54 and 56 for purposes which will become readily apparent as the description herein progresses. Additionally, a suitable aquarium aerating device can be positioned with the middle hatching chamber 68 to accelerate shrimp production in a manner which has been previously described.

Since the hatched shrimp tend to migrate toward light, it is desirable to enclose the hatching and subsidance chambers with a suitable opaque cover member 74. In this connection it should be pointed out that the walls and partitions which define both the subsidance and collection chambers should also be made opaque to occlude light. Since the entire hatcher can be made from transparent plastic, each of these chambers may be made opaque by merely applying an opaque coating. On the other hand, collection chamber C must be made translucent in order to permit the introduction of light into the darkened hatching and subsidance chambers through the related apertures and openings formed in each of the interior dividing partitions. In order to assure constant illumination of the collection chamber, any suitable type of artificial light, either incandescent or fluorescent, as well as natural sunlight, can be utilized and may be directed or reflected into the collection chamber C, in any well known manner.

Since the interior compartments of the shrimp hatcher must be suitably illuminated to effect migration of the hatched shrimp, it is essential that each aperture formed in one partition be in substantial alignment with a related opening formed in the adjacent partition in order to prevent obstruction of the light beam as it passes through subsidance chamber S into hatching chamber H. Preferably, these apertures are formed somewhere above the bottom of the fluid receptacle but below the upper surface of the brine solution to prevent any eggs or debris from continuously flowing into the subsidance chamber. Normally, most of the shrimp eggs will initially float on the surface of the brine solution until they become water logged and sink to the bottom of the hatching chamber H where they will either hatch or spoil and accumulate as debris along the bottom of the compartment. Accordingly, the migratory outlets or passageways which are formed in each of the interior partitions must be located slightly above the bottom of the hatching chamber H but immediately below the surface of the brine solution in order to effectively prevent contamination of the collecting chamber C.

As shown in Figure 1, apertures 26 and 28 formed in interior partitions 22 and 24, respectively, have been positioned equi-distantly between the sidewalls 12 and 14 in a concentrated group located intermediate the upper and lower edge of the associated partition. Additionally, each of the apertures 26 formed in partition 22 are in substantial axial alignment with a related opening 28 formed in partition 24 so that light directed into collection chamber C will pass without obstruction through the subsidance chamber S into hatching chamber H. Since the hatched shrimp located within the hatching chamber tend to migrate toward light, they will swim outwardly through opening 26 into subsidance chamber S and continue to follow the light beam outwardly through aperture 28 into collection chamber C. Due to the continuous swimming motion of the hatched shrimp, any debris suspended in the brine solution which has not settled to the bottom of the hatching chamber would also pass outwardly through outlets 26 formed in the interior dividing partition 22. However, once this debris enters the dead space of subsidance chamber S, it will tend to precipitate or settle along the bottom of the fluid receptacle. In this way, any debris which accidentally escapes from the hatching chamber will become trapped within the subsidance chamber where it is completely separated from the fluid which enters the collection chamber. Accordingly, the shrimp eggs deposited in the hatching chamber can be continuously agitated to accelerate production without fear of contaminating the collection chamber since any debris which passes outwardly through the shrimp outlets into the subsidance chamber or chambers will be separated before it can enter the collection chamber.

As shown in Figure 2, it is often desirable to employ a successive series of subsidance chambers in order to insure complete separation of the debris from the brine solution before it enters the collection chamber. While primary and secondary subsidance chambers 38 and 40, respectively, are shown, it should be understood that any desired number of chambers may be employed, particularly when continuous aeration of the hatching chamber tends to expel excessive amounts of debris through the aperture outlets.

In order to prevent accumulated debris from being drawn outwardly into the collection chamber while the hatched shrimp and brine solution are being removed, it is desirable to employ a suitable cut-off gate or valve assembly 76 for preventing the liquid level of the interior hatching and subsidance chambers from falling below the upper-most aperture formed in the dividing partitions. Preferably, valve assembly 76 is positioned on the interior partition which separates the collection chamber from the subsidance chamber and generally includes a sliding panel 78 which moves within suitable guideways 80 so that it can be manually moved across the aperture outlets to prevent any fluid from escaping from the subsidance chamber while the hatched shrimps are being syphoned from the collection chamber. Additionally, once the hatched shrimp have been collected, the collection chamber can then be refilled, either with a new brine solution or with the original solution without disturbing any of the debris which has accumulated in either the subsidance or hatching chambers.

As previously mentioned, it is possible to provide a removable hatching assembly which can be repeatedly inserted and removed from a separate fluid receptacle, as shown in Figure 4. In this connection, both the interior partitions and the outer walls of the hatching assembly must extend above the surface of the brine solution contained within the receptacle. As shown, apertures 82 and 84, which are formed in the longitudinally extending partitions 64 and 66, are aligned with related openings 86 and 88 formed in outer side panels 54 and 56, respectively. In order to prevent debris from escaping from the middle hatching compartment 68, the partition apertures 82 and 84 and the panel openings 86 and 88 are positioned between the upper surface of the brine solution and the bottom 62 and are illustrated as a pair of parallel extending rows. In order to occlude light from the outer subsidance chambers 70 and 72 and the middle hatching compartment 68, and opaque cover 74 is provided which extends across the upper portion of the hatching assembly 52. Since the operation of the hatching assembly 52 is identical in principle to that shown in Figures 1 and 2, a further description does not appear to be necessary.

Finally, it should be understood that the apertures formed in one partition can be slightly offset from those formed in the adjacent partition, either in a vertical or horizontal direction, as long as related apertures are in substantial alignment so as not to obstruct the passage of light. Additionally, the size of the aperture can easily be varied; but preferably should be sufficient to allow the passage of shrimp but not any unhatched eggs.

It is also to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

I claim:

1. A shrimp hatching device comprising a casing having interconnected bottom and side walls joined together to form a fluid receptacle, a partition extending upwardly from the bottom of said casing between said side walls for dividing said receptacle into primary and secondary chambers, a top member enclosing said primary chamber, said top member and said partition as well as said bottom and side walls defining said primary chamber being opaque, a fluid passageway formed in said partition above the bottom of said casing interconnecting said primary chamber with said secondary chamber to permit the passage of light into said primary chamber for separating hatched shrimp from accumulated debris by effecting migratory movement through said passageway toward said secondary chamber.

2. A shrimp hatching device as defined in claim 1 additionally including aerating means disposed within said primary chamber for accelerating shrimp production.

3. A shrimp hatching device as set forth in claim 2 additionally including valve means for interrupting migration of shrimp through said fluid passageway.

4. In combination with a liquid receptacle, a shrimp hatcher comprising a casing having a top and bottom with side walls extending therebetween to form an enclosed compartment, said casing being substantially opaque to light, a partition for dividing said compartment into a hatching chamber and subsidance chamber, said partition extending from the bottom of said casing above the level of liquid in said receptacle, a first passageway formed in said partition, said passageway being located intermediate the bottom of said casing and the level of liquid in said receptacle to afford fluid communication between said hatching chamber and said subsidance chamber, a second passageway formed in said casing sidewall defining said subsidance chamber, said second passageway being located intermediate the bottom of said casing and the level of liquid in said receptacle to afford fluid communication between said subsidance chamber and said receptacle, a secondary partition disposed within said compartment for subdividing said subsidance chamber into primary and secondary subsidance chambers, a third passageway formed in said secondary partition, said third passageway being located intermediate the bottom of said casing and the level of liquid in said receptacle to afford fluid communication between said primary and secondary subsidance chambers, each of said passageways being in substantial alignment with one another to admit light into said compartment for effecting separation of egg and shell debris from hatched shrimp during migration of the same toward light through said primary and secondary subsidance chambers into said liquid receptacle.

5. The combination of claim 4 additionally including aerating means disposed within said hatching chamber for agitating said liquid to accelerate shrimp production.

6. The combination of claim 4 additionally including valve means for interrupting the flow of fluid through said second passageway for permitting the collection of shrimp from said liquid receptacle without affecting the level of liquid in said compartment.

7. In combination with a liquid receptacle a removable shrimp hatcher comprising a casing having a top and bottom with sidewalls extending therebetween to form an enclosed compartment, said casing being suspended within said receptacle and substantially opaque to light, a pair of partitions located within said casing dividing said compartment into a central hatching chamber and a pair of subsidance chambers disposed on opposite sides of said hatching chamber, said partitions extending from the bottom of said casing above the level of liquid in said receptacle, primary outlet passageways formed in each of said partitions above the bottom of said casing and below said liquid level to afford fluid communication between said hatching chamber and an adjacent subsidance chamber, a secondary outlet passageway formed in the casing sidewall of each subsidance chamber above the bottom and below the level of liquid in said receptacle, said primary and secondary passageways being in substantial alignment to admit light into said central hatching chamber for effecting separation of egg and shell debris from the hatched shrimp during migration of the same toward light through either of said subsidance chambers into said liquid receptacle.

8. The combination of claim 7 additionally including aerating means disposed within said central hatching chamber for continuously agitating said liquid to accelerate shrimp production.

9. The combination as in claim 7 additionally including valve means for interrupting the flow of fluid through each of said secondary passageways for permitting the collection of shrimp from said liquid receptacle without affecting the level of liquid in said compartment.

10. The combination of claim 7 additionally including a pair of secondary partitions disposed within said compartment for subdividing each of said subsidance chambers into primary and secondary subsidance chambers, a third passageway formed in each of said secondary partitions above the bottom of said casing and below said liquid level affording fluid communication between said primary and secondary subsidance chambers, said third passageway being in substantial alignment with said primary and secondary outlet passageways to permit the passage of light therethrough.

11. A shrimp hatching device comprising a casing having interconnected bottom and sidewalls forming a liquid receptacle, a first partition dividing said receptacle into two compartments, one of said compartments defining a collection chamber, a second partition subdividing the other compartment into a hatching chamber and a subsidance chamber, said subsidance chamber being disposed between said hatching and collection chambers, said first and second partitions extending from the bottom of said casing above the level of liquid in said receptacle, a top for enclosing said hatching and subsidance chambers to occlude light, and a passageway formed in each of said partitions above the bottom of said casing and below said liquid level for effecting separation of the hatched shrimp from debris during migration toward light from said hatching chamber through said subsidance chamber and into said collection chamber.

12. A shrimp hatching device as defined in claim 11 additionally including aerating means disposed within said hatching chamber for continuously agitating said liquid to accelerate shrimp production.

13. A shrimp hatching advice as in claim 11 additionally including valve means for interrupting the flow of fluid through the passageway formed in said first partition to permit the collection of shrimp from said collection chamber without affecting the level of liquid in said subsidance and hatching chambers.

14. A shrimp hatching device as in claim 11 additionally including a third partition disposed within the latter-mentioned compartment for subdividing said subsidance chamber into primary and secondary subsidance chambers, an intermediate passageway formed in said third partition above the bottom of said casing and below said liquid level affording fluid communication between said primary and secondary subsidance chambers, said intermediate passageway being in substantial alignment with the passageways formed in said first and second partitions to permit the passage of light therethrough.

References Cited in the file of this patent

UNITED STATES PATENTS

| | | |
|---|---|---|
| 160,002 | Bond | Feb. 23, 1875 |
| 833,418 | Ruckl | Oct. 16, 1906 |
| 1,023,590 | Parry | Apr. 16, 1912 |
| 1,509,979 | Pryor | Sept. 30, 1924 |
| 2,611,337 | Vibert | Sept. 23, 1952 |
| 2,804,045 | Scott | Aug. 27, 1957 |